Oct. 10, 1967   YASUO HIROSE ET AL   3,346,676
METHOD FOR THE PRODUCTION OF CERAMIC NUCLEAR FUEL ELEMENTS
Filed Oct. 28, 1964
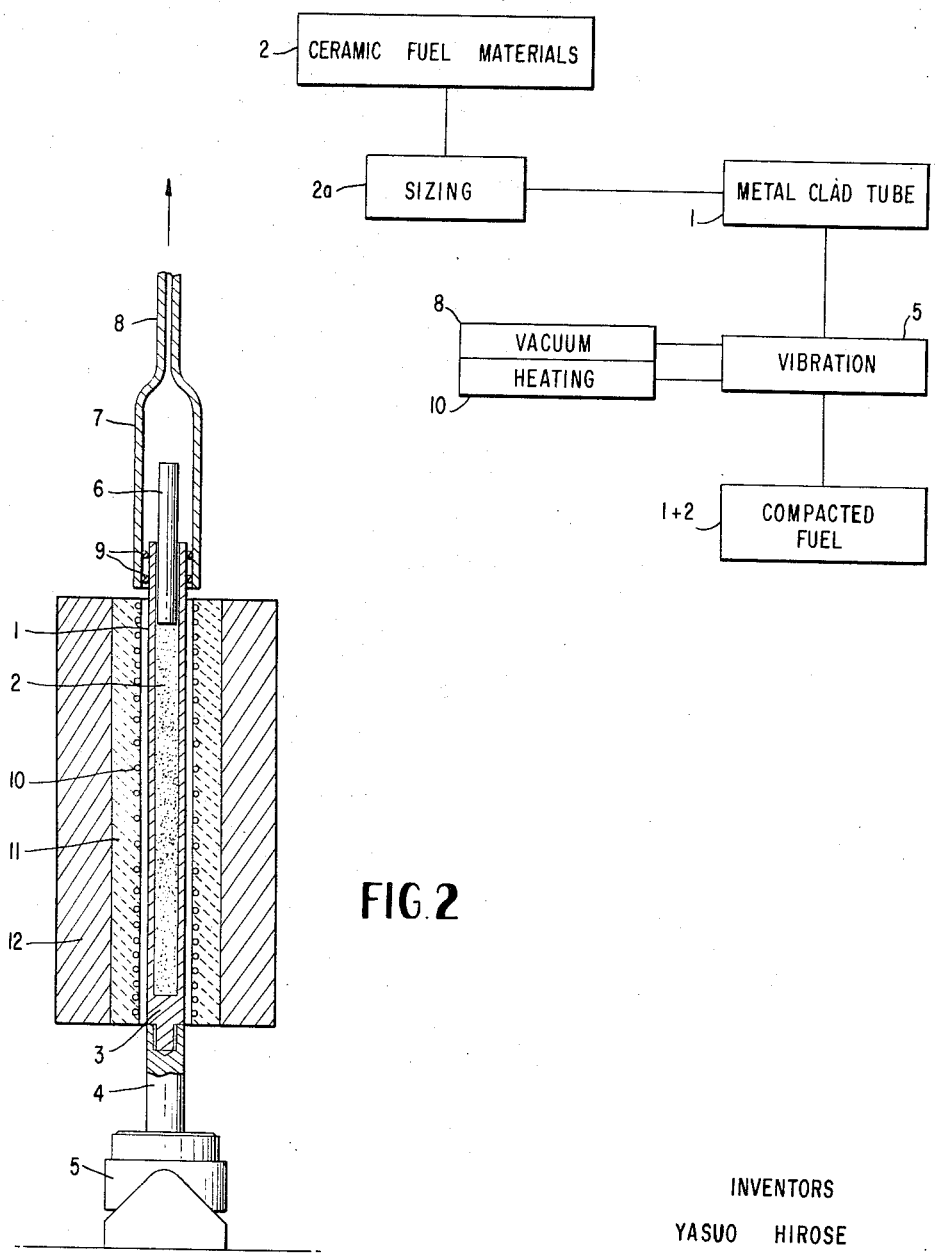
INVENTORS
YASUO HIROSE
SEIJI TAKEDA

United States Patent Office 3,346,676
Patented Oct. 10, 1967

3,346,676
METHOD FOR THE PRODUCTION OF CERAMIC NUCLEAR FUEL ELEMENTS
Yasuo Hirose and Seiji Takeda, Hitachi-shi, Japan, assignors to Hitachi, Ltd., Tokyo, Japan, a corporation of Japan
Filed Oct. 28, 1964, Ser. No. 407,213
Claims priority, application Japan, Oct. 28, 1963, 38/57,306
2 Claims. (Cl. 264—.5)

This invention relates to a method of producing ceramic nuclear fuel elements, and more particularly, it relates to a method of the production wherein ceramic fuel powders are packed into a metal covering tube by a vibration packing technique. The object of this invention is to increase the packing density of the ceramic fuel powders.

The so-called vibration packing technique is to thicken the powders densely by causing reorientation of the particles so as to minimize the space between them. In this technique, the ceramic fuel powders which are made to have a proper particle size distribution, are placed into a metal cover or cladding, and then vibration and impacts are applied to the system from the outside thereof to cause stirring action of the structural particles of this powder system.

In nuclear fuels of the type that the ceramic fuel powders are thus packed into a metal cladding tube, it is desired that the packing density is as high as possible. This serves to increase thermal properties of the nuclear fuel, neutron economy of the reactor and the like and lowers the fuel cost.

The present invention satisfies such requirements and also discloses the method of producing ceramic nuclear fuel elements which has an effect of removing off several kinds of gases adsorbed into the inner surface of the covering tube and into the surface of ceramic fuel powders. The presence of such absorbed gases, if left, produces undesirable effects in the operation of the fuel element. More concretely, the production of ceramic nuclear fuel elements by the vibration packing technique is proposed wherein, in accordance with the method of this invention ceramic fuel powders are charged into the metal covering tube and vibrations or impacts to the tube are added so as to pack them in high density. The method is characterized by reducing the pressure of the inner parts of the metal cladding tube including ceramic fuel powders and heating at the same time to the temperature not exceeding 300° C. in carrying out the above operations.

A method and an apparatus suitable for practicing the invention are illustrated in the drawings wherein:

FIGURE 1 is a functional block diagram illustrating the flow of operations practiced in carrying out the method of the invention; and FIGURE 2 is a longitudinal sectional view of a suitable apparatus for use in fabricating ceramic fuel rods in accordance with the method of the invention.

The method of practicing the invention illustrated in FIGURE 1 is initiated in connection with a supply of ceramic fuel materials shown at 2, the nature of which will be described more fully hereinafter. The ceramic fuel materials 2 are first sized as shown at 2a and the sized ceramic fuel powder inserted in a metal cladding tube 1. Subsequent to insertion of the sized ceramic fuel material in the metal cladding tube 1, it is mounted on a vibration table shown at 5 and concurrently subjected to evacuation by a suitable vacuum apparatus shown at 8 and heating as shown at 10. As a consequence of the simultaneous vibration evacuation and heating, the resultant compacted fuel rod is produced as shown at 1+2.

The above mentioned heating and pressure reducing are carried out at the latest, after charging of the powders has been finished and before the high density packing operation is started by means of vibration or impacts. These heating and pressure reducing operations are continued until high density packing is completed. One example of the method of this invention will be illustrated hereinafter.

Prior to describing the method of the invention in detail, an apparatus suitable for carrying out the method will be described in connection with FIGURE 2 of the drawings. In FIGURE 2, a stainless steel covering or cladding tube is shown at 1 filled with a ceramic fuel powder shown at 2. The ceramic fuel powder 2 is retained in tube 1 by an end cap 3 secured over the end of the tube. End cap 3 is mounted in a suitable connector chuck for fixing the fuel rod on a vibration exciter shown at 5. The ceramic fuel powder 2 is compacted within the cladding tube 1 by means of a follower rod 6 for tamping or compacting at least the uppermost particles into place within cladding tube 1. To heat the ceramic powder to sintering temperatures a heating element 10 is supported within a refractory liner 11 that in turn is secured within an outer furnace shell 12. An adapter element, shown at 7, surrounds the follower rod 6 and cladding tube 1 on the upper end thereof, and is provided with a vacuum type seal in the form of a rubber O ring 9 secured between the upper end of metal cladding tube 1 and the lower end of the adapter element 7. The upper end of the adapter element 7 is connected through suitable tubing shown at 8 to a vacuum system for evacuating the space within the cladding tube 1 within which the ceramic fuel powder 2 is secured.

*Example*

200 grams of finely divided powders of fused $UO_2$ illustrated generally at 2 in FIGURE 2 and containing 60% of −4 to +28 mesh coarse particles, 20% of −28 to +200 mesh moderately fine particles and 20% of 200 mesh fine particles are charged into a stainless steel covering tube 1 which is 12.0 mm. in outer diameter and 500 mm. long and with wall thickness of 0.6 mm. A push rod 6 is inserted upon the upper end of the packed layer so as to prevent the particles from flying out, and then the tube is fitted to a vibrations table 5. The upper part of the covering tube is fitted with an adapter 7 in order to introduce helium gas or to reduce the pressure inside the tube. The inner parts of the covering tube are evacuated to a reduced pressure by a vacuum pump through connection 8 and the parts where powdered $UO_2$ is packed are heated from outer side of the covering tube after the inner pressure has reached less than $10^{-2}$ mm. Hg. In the case, where the results are shown under reduced pressure, the reduced pressure is continued as it is, and in the case, where the results are shown under normal pressure, helium gas is introduced into the covering tube at the pressure equal to that of atmosphere, and when the desired temperature has been attained by heating, vibration is applied having $60g$ ($g$ is the acceleration unit of gravity) of accelerated velocity with 0.02 mm. displacement until saturation density is obtained. When the saturation density is attained, the covering tube is cooled to the room temperature and the packing densities are measured in each case of the powders under reduced pressure and under normal pressure.

The following table illustrates the results as measured above.

| Heating temperature | Packing density (percent theoretical density ratio) | |
|---|---|---|
| | Under normal pressure | Under reduced pressure |
| Room temperature | 87.8 | 88.0 |
| 100° C | 88.1 | 89.6 |
| 200° C | 88.1 | 89.4 |
| 300° C | | 87.8 |
| 400° C | | 87.0 |

From the above table, the influence of heating and pressure reducing operations upon the packing density are seen. Moderate heating and moderate pressure reducing have an effect of increasing the packing density as shown in this table and particularly in the case where heating is carried out to the temperature of 100° to 200° C. under reduced pressure, the effect of increasing the packing density is most remarkable. But it is found that, even under reduced pressure, a heating temperature in excess of 300° C. results in the packing density lower than that obtained under normal pressure. The degree of reduced pressure is not limited in particular, and it is expected that the effect of the reduced pressure will be increased as the pressure is decreased.

As fully described hereinbefore, the method of this invention permits packing of ceramic fuel powders into the metal covering tube by use of the vibration packing technique with moderate heating under reduced pressure and also has some advantages as described hereinafter.

(1) The thermal conductivity of the fuel is increased and the thermal properties thereof are improved.

(2) The fuel density in the reactor is increased and the amounts of the fuel materials required are decreased.

(3) As the gases adsorped into the wall inside the covering tube and into the surface of the fuel powders are removed, rising of the inner pressure of the covering tube in operation can be prevented and the degradation of the fuel in the thermal properties in radiation can also be prevented.

What we claim is:

1. The method of manufacturing metal clad non-sintered ceramic powder nuclear fuel elements of great density from a metallic cladding tube and ceramic nuclear fuel powder wherein the ceramic nuclear fuel powder is placed in the metal cladding tube and compacted therein by vibration, the improvement comprising subjecting the inner parts of the metal cladding tube including the ceramic nuclear fuel powder to evacuation while heating the same to a temperature below the sintering temperature of the ceramic nuclear fuel powder and concurrently compacting the powder in the metal clad tube by vibration.

2. The method set forth in claim 1 wherein the temperature to which the evacuated and vibrated powder filled metal clad tube is heated does not exceed 300° centigrade.

References Cited
UNITED STATES PATENTS

| 1,896,854 | 2/1933 | Taylor | 75—225 X |
| 2,198,612 | 4/1940 | Hardy | 264—71 |
| 2,725,288 | 11/1955 | Dodds et al. | 264—.5 X |
| 2,818,339 | 12/1957 | Dodds | 75—225 |
| 2,893,102 | 7/1959 | Maxwell et al. | 264—69 X |
| 3,141,911 | 7/1964 | Hauth | 264—.5 |
| 3,142,533 | 7/1964 | Accary et al. | 75—255 X |

FOREIGN PATENTS

| 926,136 | 5/1963 | Great Britain. |

L. DEWAYNE RUTLEDGE, *Primary Examiner.*